United States Patent
Shen et al.

(10) Patent No.: US 12,515,255 B2
(45) Date of Patent: Jan. 6, 2026

(54) LOW LIGHT IMAGE ENHANCEMENT METHOD FOR ON-LINE VISUAL MONITORING IN METAL ADDITIVE MANUFACTURING PROCESS

(71) Applicant: WUHAN UNIVERSITY, Hubei (CN)

(72) Inventors: Shengnan Shen, Hubei (CN); Hui Li, Hubei (CN); Jiafeng Xiao, Hubei (CN); Wei Han, Hubei (CN); Xuechun Wang, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 18/926,325

(22) Filed: Oct. 25, 2024

(65) Prior Publication Data
US 2025/0360567 A1 Nov. 27, 2025

(30) Foreign Application Priority Data
May 24, 2024 (CN) .......................... 202410653529.7

(51) Int. Cl.
*B22F 10/85* (2021.01)
*G06T 5/60* (2024.01)
*B33Y 50/02* (2015.01)

(52) U.S. Cl.
CPC ................ *B22F 10/85* (2021.01); *G06T 5/60* (2024.01); *B33Y 50/02* (2014.12);
(Continued)

(58) Field of Classification Search
CPC . B22F 10/85; G06T 5/60; G06T 2207/10016; G06T 2207/20081;
(Continued)

(56) References Cited

U.S. PATENT DOCUMENTS 9,947,821 B2 * 4/2018 Hallam ............... H01L 21/3003
11,084,225 B2 * 8/2021 Pinskiy .................. G06N 3/045
(Continued)

FOREIGN PATENT DOCUMENTS

CN 111292257 6/2020
CN 112001863 11/2020
(Continued)

OTHER PUBLICATIONS

Zhen Zhang et al., "Low-light Image Enhancement Network Based on Multichannel R etinex Model", Information and Control, with English translation thereof, Apr. 23, 2024, pp. 1-24.
(Continued)

*Primary Examiner* — Shefali D Goradia
(74) *Attorney, Agent, or Firm* — JCIP GLOBAL INC.

(57) ABSTRACT

The present invention discloses a low light image enhancement method for online visual monitoring of metal additive manufacturing process. A video of the metal additive manufacturing process is captured using a high-speed camera and exported frame by frame to construct a low light and bright light image dataset. Based on Retinex vision theory, a low
(Continued)

light image enhancement network model is constructed, and the reflection and illumination maps are fused into an enhanced image and the loss function value is calculated to complete the iterative training of the low light image enhancement network model. The low light image enhancement network model is deployed to the online monitoring hardware platform to calculate the image quality evaluation indexes. The present invention overcomes the difficulties of the low light environment of the metal additive manufacturing process online visual monitoring images with a lot of noise and poor geometric feature extraction accuracy.

6 Claims, 9 Drawing Sheets

(52) U.S. Cl.
CPC .............. *G06T 2207/10016* (2013.01); *G06T 2207/20081* (2013.01); *G06T 2207/20172* (2013.01); *G06T 2207/30136* (2013.01)

(58) Field of Classification Search
CPC ........... G06T 2207/20172; G06T 2207/30136; B33Y 50/02
See application file for complete search history.

(56) References Cited

U.S. PATENT DOCUMENTS

| | | | |
|---|---|---|---|
| 2018/0120260 A1* | 5/2018 | Goldfine | G01N 27/9046 |
| 2019/0283333 A1* | 9/2019 | Hwang | G06N 20/00 |
| 2022/0134435 A1* | 5/2022 | Scime | G06T 7/11 264/112 |
| 2022/0134647 A1* | 5/2022 | Gold | B22F 12/90 264/40.1 |
| 2022/0172330 A1* | 6/2022 | Mason | G06T 5/50 |

FOREIGN PATENT DOCUMENTS

| | | | | |
|---|---|---|---|---|
| CN | 113450261 | | 9/2021 | |
| CN | 117115018 | | 11/2023 | |
| WO | 2022119877 | | 6/2022 | |
| WO | WO-2023111542 A1 * | | 6/2023 | ............. B22F 10/38 |
| WO | WO-2024172874 A2 * | | 8/2024 | ............. C22C 33/02 |

OTHER PUBLICATIONS

Pengyue Li et al., "Deep Retinex Network for Single Image Dehazing", IEEE Transactions on Image Processing, Dec. 1, 2020, pp. 1100-1115.

* cited by examiner

LOW LIGHT IMAGE ENHANCEMENT METHOD FOR ON-LINE VISUAL MONITORING IN METAL ADDITIVE MANUFACTURING PROCESS

CROSS-REFERENCE TO RELATED APPLICATION

This application claims the priority benefit of China Application Serial Number 202410653529.7, filed on May 24, 2024. The entirety of the above-mentioned patent application is hereby incorporated by reference and made a part of this specification.

BACKGROUND

Technical Field

The present invention belongs to the field of image data processing for on-line visual monitoring of metal additive manufacturing, and specifically relates to a low light image enhancement method oriented to on-line visual monitoring of metal additive manufacturing process.

Description of Related Art

As a cutting-edge technology of high-end manufacturing, metal additive manufacturing has the advantages of digitalization, automation, high material utilization, and has received wide attention in the fields of national defense engineering and aerospace. The interaction between laser and powder in metal additive manufacturing process leads to complex non-equilibrium physical metallurgical and thermophysical processes, which often leads to quality problems such as cracks and porosity, so it is crucial to carry out on-line monitoring of the metal additive manufacturing process to improve the stability of the manufacturing process.

Currently, online visual monitoring of metal additive manufacturing processes based on optical signals is a commonly used method, and researchers have used high-speed cameras to capture videos of the manufacturing process and further extract key feature information to realize online visual monitoring of component quality and defects. However, high-speed camera shooting frame rate is high, exposure time is short, and specific wavelength filters need to be installed in front of the lens, so the captured image will show low brightness, and information is easily lost and noise is generated during imaging, resulting in low quality of captured image. Improving the hardware performance of the shooting equipment can improve the imaging quality to a certain extent, but this will increase the cost. Therefore, in the actual online visual monitoring of metal additive manufacturing process, it is important to improve the brightness of low light image by low light image enhancement algorithm.

At present, low light image enhancement methods are mainly divided into gray scale transformation, histogram equalization, frequency domain methods, image fusion, defogging model and machine learning. Traditional low light image enhancement methods are difficult to improve image brightness while retaining the clear features of the image, and are prone to situations such as inconspicuous image contours. There are also problems such as dark area artifacts, color mutation, distortion, noise interference, etc., which do not give satisfactory results. Machine learning-based methods learn the mapping from low light images to bright images from a large number of images to achieve low light image enhancement, but there is a huge dependence on the amount of data, and existing algorithms commonly use images taken in daily life as enhancement objects. It is not effective in the online visual monitoring scenario of metal additive manufacturing, and the performance of the algorithm needs to be improved for direct application.

SUMMARY

To solve the above technical problems, the present invention provides a low light image enhancement method for online visual monitoring of a metal additive manufacturing process, which effectively improves the quality of the online monitoring image of the metal additive manufacturing process and helps to enhance the online monitoring capability of the metal additive manufacturing.

The technical scheme of the invention are as follows.

First, the invention provides a low light image enhancement method for online visual monitoring of a metal additive manufacturing process, including the following steps.

Step 1: A hardware platform for online visual monitoring of the metal additive manufacturing process is built to capture video of the metal additive manufacturing process using a high-speed camera.

Step 2: The original shot video is exported frame by frame, and the low light and bright light image dataset is constructed. The bright light image is obtained by brightening the low light image.

Step 3: The low light image enhancement network model based on Retinex vision theory is constructed. The low light image enhancement network model comprises a layer decomposition network, a reflection adjustment network and an illumination adjustment network. The layer decomposition network comprises two branches, a reflection map branch and an illumination map branch. The reflection map branch is a simplified U-Net structure, which is used to extract the reflection components from an image which is input, and subsequently extracts the low-level feature and high-level feature and combines them to generate the reflection map. The illumination map branch comprises convolutional layers, connection layer, ReLU layer, and Sigmoid layer, and the illumination map branch acquires the feature maps from the reflection map branch, extracts and enhances the light features of the image, and is subsequently processed to extract and enhance the light features of the image. The light features of the image are enhanced by deep convolution and nonlinear activation of the feature maps, and the light changes are captured and adjusted by performing deep convolution and nonlinear activation on the feature maps to accurately simulate the changes in lighting conditions and details in the final enhancement process.

The reflection adjustment network gradually extracts and abstracts image features through a series of convolutional layers to output an adjusted reflection image.

The illumination adjustment network is used to enhance local details and global illumination variations of an image to generate an illumination map recovery image.

Step 4: Low light image enhancement network model is trained. The input low light image is decomposed into reflection map and illumination map by the layer decomposition network, and the enhanced reflection map and illumination map are generated by the reflection adjustment network and the illumination adjustment network. The peak signal-to-noise ratio (PSNR) and structural similarity index (SSIM) are calculated, and then the loss function is calculated to complete the iterative training of the low light image enhancement network model.

Step 5: The low light image enhancement network model is deployed to the online monitoring hardware platform to calculate the image quality evaluation metrics PSNR and SSIM.

In a possible embodiment, in step 1, the monitoring hardware platform comprises a computer, an illumination light source power supply, a high-speed camera, a macro lens, an illumination light source and a metal additive manufacturing device.

In a possible embodiment, in step 3, the reflection map branch in the layer decomposition network sequentially comprises a first convolutional+ReLU layer, which comprises Conv+ReLU 32, Conv+ReLU 64 and Conv+ReLU 128, a first transposed convolutional+ReLU layer, a first connection layer, a second convolutional+ReLU layer, a second transposed convolutional+ReLU layer, a second connection layer, a third convolutional+ReLU layer, and a convolutional layer+Sigmoid function. The first convolutional layer+ReLU layer is jump-connected to the first connection layer and the second connection layer, respectively.

The illumination map branch includes a convolutional+ReLU layer, a connection layer, and a convolutional layer+Sigmoid function.

In a possible embodiment, in step 3, the reflection adjustment network sequentially comprises: an initial convolutional layer for extracting initial features of the image, a second convolutional layer for capturing a larger range of contextual information, a third convolutional layer for enhancing the expressiveness of the features, a fourth convolutional layer for feature fusion while maintaining details, a fifth convolutional layer for extracting deep features of the image, and a final convolutional layer for generating an adjusted reflection image by using ReLU activation function.

In a possible embodiment, in step 3, the illumination adjustment network comprises a local sub-network and a global sub-network.

Among them, the global sub-network comprises an average pooling layer, three convolutional layers, ReLU layer, convolutional layer+Sigmoid function in turn, which are used to capture and adjust the global illumination variations of the image; the global sub-network captures the overall luminance information of the image through the average pooling layer and uses the convolutional kernel to perform the feature mapping and combining, which ultimately generates the global sub-network image.

The local sub-network comprises four convolutional layers+ReLU layer, convolutional layer+Sigmoid function, which are used to refine and enhance the local illumination details and mapped to the output channel.

Local and global features are combined by parameter weighting to balance the effects of detail enhancement and overall brightness adjustment to produce an illumination map recovery image.

In a possible embodiment, in step 4, the PSNR is calculated as follows:

$$PSNR = 10 \cdot \log_{10}\left(\frac{MAX_I^2}{MSE}\right) = 20 \cdot \log_{10}\left(\frac{MAX_I}{\sqrt{MSE}}\right)$$

where $MAX_I$ denotes the maximum value taken by all pixels of image I.

$$MSE = \frac{1}{mn}\sum_{i=0}^{m-1}\sum_{j=0}^{n-1}[I(i, j) - K(i, j)]^2$$

where the size of the original image is m×n, I(i,j) denotes the pixel value of the reference image I at coordinates (i, j), and K(i,j) denotes the pixel value of the image K to be evaluated at coordinates (i, j).

The formula for SSIM is as follows:

$$SSIM = \frac{(2\mu_x\mu_y + C_1)(2\sigma_{xy} + C_2)}{(\mu_x^2\mu_y^2 + C_1)(\sigma_x^2 + \sigma_y^2 + C_2)}$$

where $\mu_x$ and $\mu_y$ denote the mean value of the image pixels, $\sigma_x$ and $\sigma_y$ denote the variance, $\sigma_{xy}$ denotes the covariance, the coordinates of a point in the image are (x, y), and $C_1$ and $C_2$ are constants that prevent the denominator from being zero.

In a possible embodiment, in step 4, the loss function is calculated as follows:

$$L_{loss} = \left(1 - \frac{PSNR(y_{true}, y_{pred})}{40}\right) + (1 - SSIM(y_{true}, y_{pred}))$$

where $y_{true}$, $y_{pred}$ denote the original and predicted images, respectively, $PSNR(y_{true}, y_{pred})$ denotes the peak signal-to-noise ratio of the original and predicted images, and $SSIM(y_{true}, y_{pred})$ denotes the structural similarity index of the original and predicted images.

In the second aspect, the present invention provides an electronic device comprising a memory, a processor and a computer program stored on said memory and runnable on the processor. The processor executes the computer program to implement the low light image enhancement method for on-line visual monitoring of a metal additive manufacturing process as described in the first aspect.

In the third aspect, the invention provides a non-transient computer-readable storage medium on which a computer program is stored. When the computer program is executed by the processor, the low light image enhancement method for online visual monitoring of the metal additive manufacturing process is realized as described in the first aspect.

In the fourth aspect, the invention provides a computer program product including a computer program. When the computer program is executed by the processor, the low light image enhancement method for online visual monitoring of the metal additive manufacturing process is realized as described in the first aspect.

The advantages of the present invention over the prior art are as follows.

The present invention combines low light image enhancement with online visual monitoring of metal additive manufacturing processes. The low light image of the metal additive manufacturing process is used as a training set, which is conducive to capturing the key feature geometries of the image using the same feature extraction algorithm, and improves the ability of online visual monitoring of the metal additive manufacturing process.

Based on Retinex vision theory, the present invention decomposes the original low light image into reflection map and illumination map and enhances them separately. Then the enhanced reflection map and the enhanced illumination map are combined to realize the overall brightness enhancement of the image, which effectively reduces the difficulty of constructing and training neural networks. The illumination adjustment network adopts global-local enhancement method to process the high dynamic range image, which ensures the uniform brightness of the output image.

The present invention reconstructs the loss function in the network training process, which can effectively improve the accuracy of the model compared to the traditional mean square error (MSE) loss function, and the output image is more consistent with the visual sensation of the human eye.

BRIEF DESCRIPTION OF THE DRAWINGS

To more clearly illustrate the technical solutions of the embodiments of the present application, the accompanying drawings required to be used in the embodiments are briefly described. The following drawings show only certain embodiments of the present application and should not be regarded as limiting the scope. For a person of ordinary skill in the art, other relevant drawings may be obtained from these drawings without creative labor.

DESCRIPTION OF THE EMBODIMENTS

To make the foregoing technical solutions better understood, the foregoing technical solutions are described below in detail with reference to the accompanying drawings of the specification and specific implementations.

Embodiment 1

Figure 1:
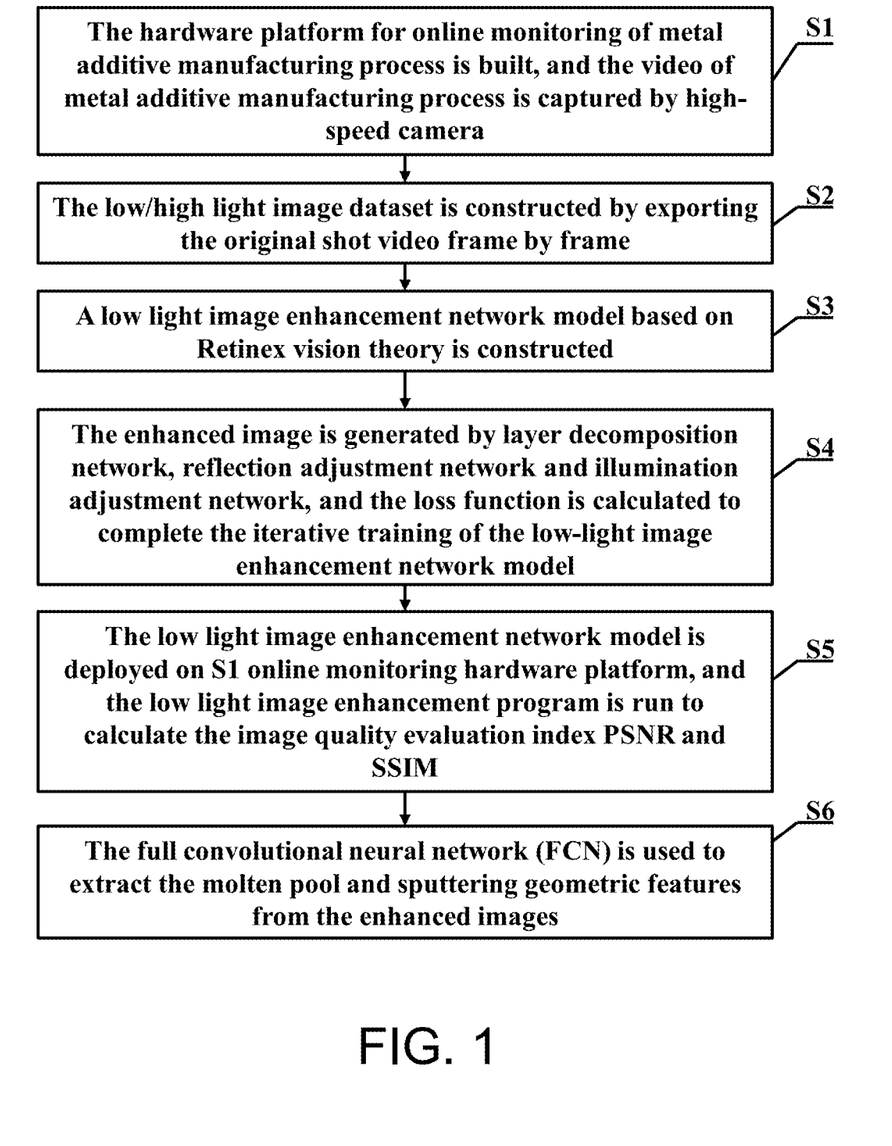
FIG. 1 shows a flowchart of a low light image enhancement method for online visual monitoring of a metal additive manufacturing process of the present invention.

The realization flow of the present invention is shown in FIG. 1. A low light image enhancement method for online visual monitoring of a metal additive manufacturing process includes the following steps:

Step 1: The hardware platform for online monitoring of metal additive manufacturing process is built, and the video of additive manufacturing process is captured by high-speed camera.

Figure 2:
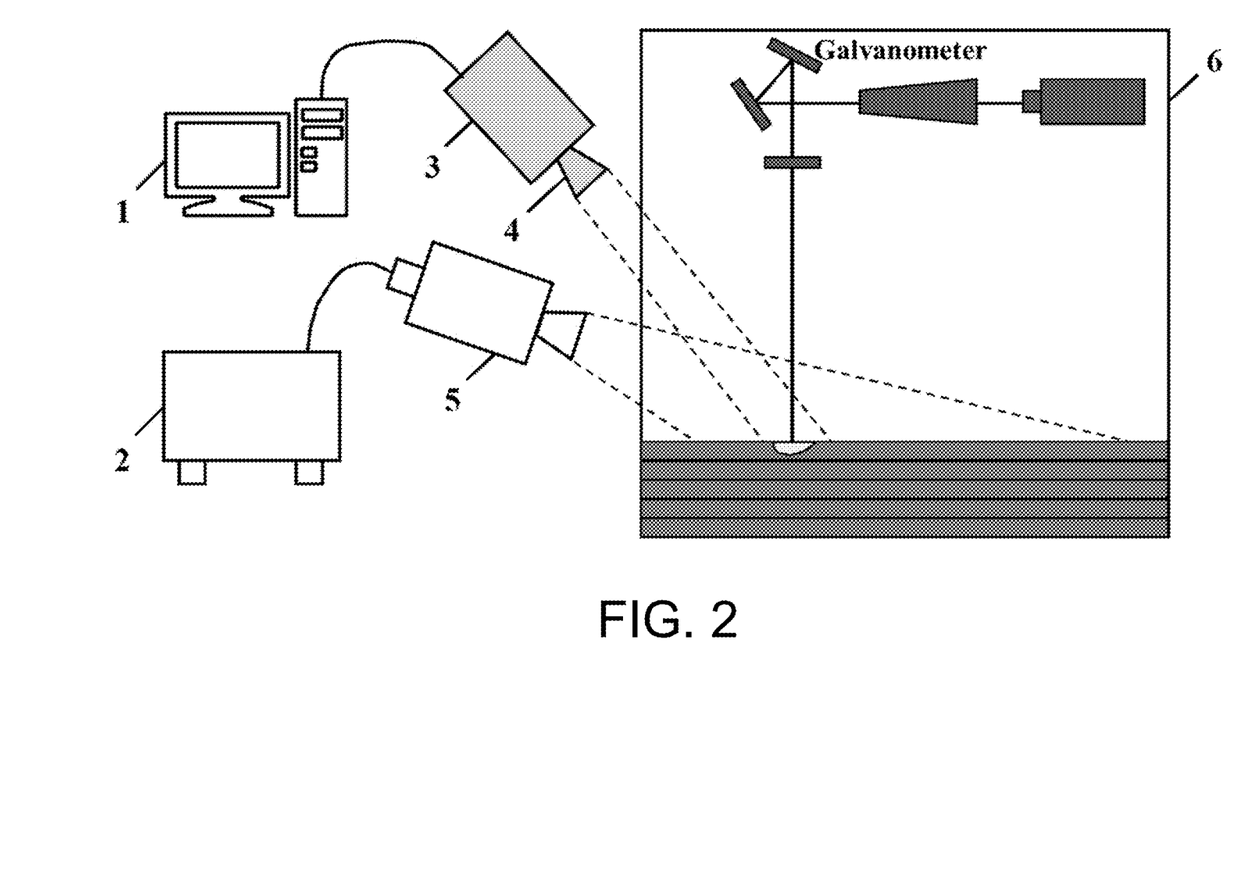
FIG. 2 is a schematic diagram of the metal additive manufacturing online visual monitoring system of the invention.

As shown in FIG. 2, the metal additive manufacturing process online vision monitoring hardware platform includes a computer 1, an illumination light source power supply 2, a high-speed camera 3, a macro lens 4, an 808 nm illumination light source 5, and a metal additive manufacturing equipment 6. The metal additive manufacturing equipment 6 (TS300A, Shanghai Techgine Laser Technology Co., Ltd., China) comprises a building chamber with 250×250×300 mm$^3$ dimensions, a recoater, and a fiber laser source with a maximum power of 500 W. The powder material used in the printing process was GH4169, and the thickness of the printed layer was 40 μm. The high-speed camera (MEMRECAM ACS-1, NAC Image Technology Inc., Japan) is mounted externally to the shelter glass, paired with an 808 nm laser light source, to chronicle the process in real time. The camera, capturing 1,280×896 pixels high-resolution images, operates at 50,000 fps frame rate. Different process data is obtained by changing the scanning speed and power of the processing laser, and then the video data is captured and transmitted to computer 1 for processing.

Step 2: the original shooting video is exported frame by frame to construct the low light and bright light image dataset. The low light and bright light image dataset of traditional low light image enhancement algorithms are all shot first with bright light images and then manually generate the corresponding low light images. In contrast, the present embodiment shoots a low light video directly, outputs the low light video as an image frame by frame, and then pulls up the brightness of each image to generate the corresponding bright light image and constitute a training set.

Specifically, the low light image is processed by gamma correction and image processing software to obtain a brightness-adjusted bright light image. Gaussian noise and Poisson noise are added to simulate the noise in the image taken under low light environment to obtain the adjusted low light image. Crop out the image area containing the melt pool and sputtering with a size of 600×400 pixels. Repeat the above process to obtain a large number of paired low light and bright light images and construct the dataset.

Step 3: construct a low light image enhancement network model based on Retinex vision theory.

Figure 3:
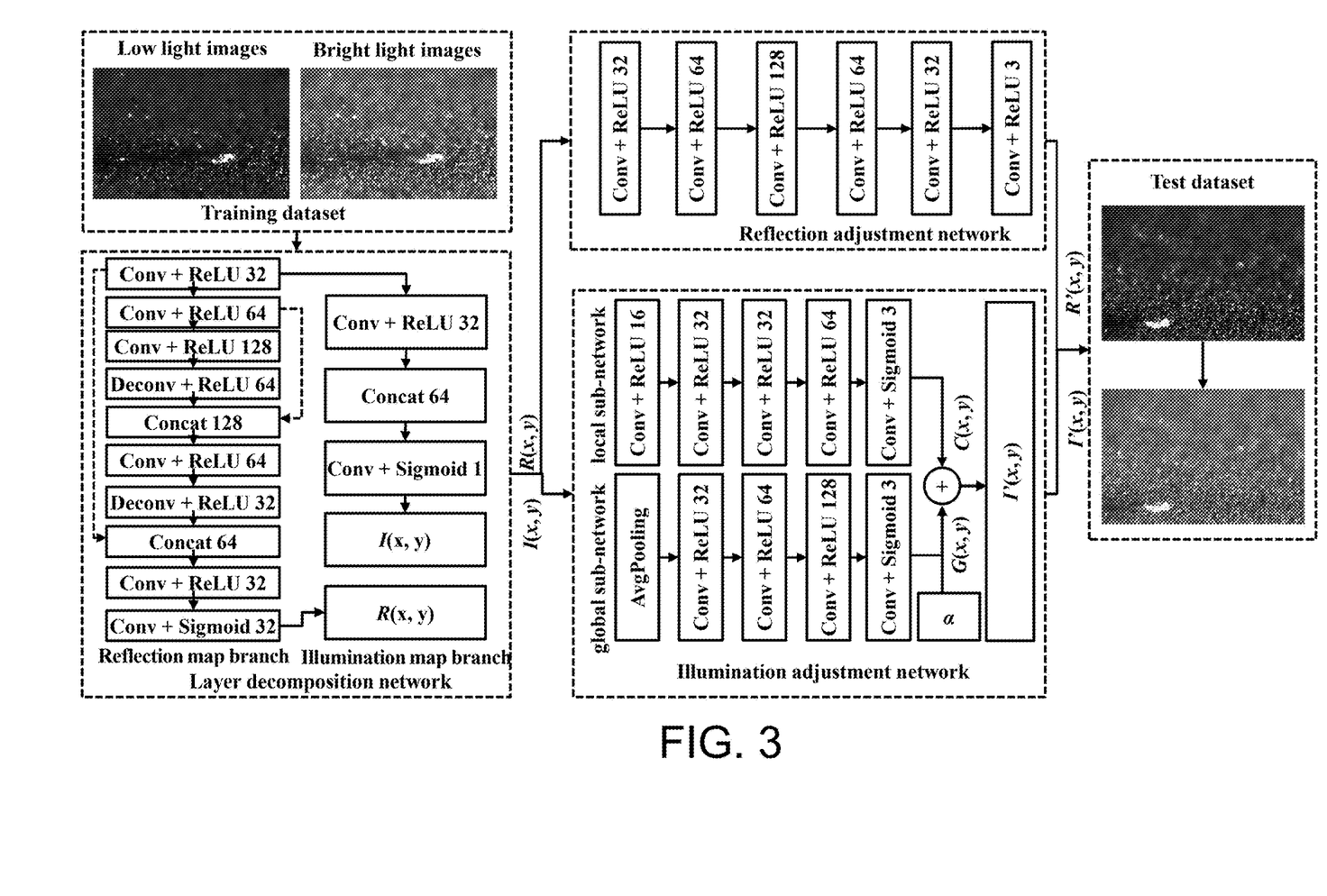
FIG. 3 shows a schematic diagram of the structure of the low light image enhancement network model of the present invention based on Retinex vision theory.

As a specific embodiment, as shown in FIG. 3, the low light image enhancement network model comprises a layer decomposition network, a reflection adjustment network, and an illumination adjustment network.

The layer decomposition network comprises two branches, a reflection map branch and an illumination map branch. The reflection map branch is a simplified U-Net structure (5 layers), which is used to extract the reflection components from the input image, and subsequently extracts the low-level and high-level features and combines them to generate the reflection map. The illumination map branch comprises convolutional layers, connection layer, ReLU layer, and Sigmoid layer, and the illumination map branch acquires the feature maps from the reflection map branch, performs subsequent processing to extract and enhance the light features of the image. The light changes are captured and enhanced by deep convolution and nonlinear activation of the feature maps to accurately simulate the changes in lighting conditions and details in the final enhancement process.

Specifically, the reflection map branch in the layer decomposition network includes a first convolutional+ReLU layer, which comprises Conv+ReLU 32, Conv+ReLU 64 and Conv+ReLU 128, a first transposed convolutional+ReLU layer, a first connection layer, a second convolutional+ReLU layer, a second transposed convolutional+ReLU layer, a second connection layer, a third convolutional+ReLU layer, a convolutional layer+Sigmoid function. Conv+ReLU 32 in the first convolutional layer+ReLU layer jumps to connect to the second connection layer, and Conv+ReLU 64 in the first convolutional+ReLU layer jumps to connect to the first connection layer.

Specifically, the illumination map branch includes a convolution+ReLU layer, a connection layer, and a convolution+Sigmoid function. The illumination map branch acquires the feature maps from the reflection map branch (Conv+ReLU 32 in the first convolutional+ReLU layer) and extracts and enhances the light features of the image through subsequent processing. Deep convolution operations and nonlinear activation of the feature maps are performed to capture and adjust lighting variations in detail to more accurately simulate changes in lighting conditions and details in the final enhancement process.

The data flow of the layer decomposition network:
1. The Reflection Map Branch

The training set is subjected to feature extraction by the first convolutional+ReLU layer, which comprises Conv+ReLU 32, Conv+ReLU 64, and Conv+ReLU 128. The extracted low-level features are then merged with the output of the subsequent layers through the first connection layer, followed by up-sampling and non-linear activation of the features through the first transposed convolution+ReLU layer. The extracted features are then merged again by the second connection layer, and then the feature extraction is continued to be deepened by the third convolutional+ReLU layer. The convolutional layer+Sigmoid function adjusts and outputs the final reflection map.

2. The Illumination Map Branch

After the training set passes through Conv+ReLU 32 of the first convolutional+ReLU layer in the reflection map branch, the features are further extracted and processed through the convolutional+ReLU layer. These features are then integrated with the outputs of other branches through the connection layer, and then finally adjusted and output the illumination map through the convolutional+Sigmoid function.

As a specific embodiment, the reflection adjustment network comprises six convolutional layers and ReLU layers for further extracting and refining reflection features from the input image. The reflection network outputs an adjusted and refined reflection map R(x,y).

As a specific embodiment, the optical tuning network comprises parallel global sub-networks and local sub-networks.

The global sub-network comprises average pooling layer, three convolutional layers, ReLU layer, convolutional layer, and Sigmoid function in turn, which are used to capture and adjust the global illumination variations of the image; the global sub-network captures the overall luminance information of the image through the average pooling layer and uses the convolutional kernel to perform the feature mapping and combining, which ultimately generates the global sub-network image.

The local sub-network comprises four convolutional layers, ReLU layer, convolutional layer, and Sigmoid function in turn, which are used to refine and enhance the local illumination details and mapped to the output channel.

The global illumination enhancement network outputs G(x, y) and the local illumination enhancement network outputs C(x, y), which are then adjusted by weight α to output the total output I'(x,y) of the illumination adjustment network.

R'(x, y) and I'(x,y) are multiplied element by element to obtain the final enhanced image.

Step 4: The input low light image is decomposed into the reflection map and the illumination map by layer decomposition network, and the enhanced reflection map and the enhanced illumination map are generated and fused into the enhanced image by the reflection adjustment network and the illumination adjustment network. Then the loss function value is calculated for iterative training of the low light image enhancement network model.

Specifically, each pixel in the image can be represented as the product of the reflection value and the illumination value at that point, as follows:

$$L(x, y) = R(x, y) \cdot I(x, y)$$

where L(x, y) denotes the pixel value of the image at coordinates (x, y), R(x, y) and I(x, y) denote the reflection value and illumination value at that location.

The input low light image is decomposed into the reflection map and the illumination map by the layer decomposition network. The reflection map output from the layer decomposition network is enhanced by the reflection adjustment network. The illumination map output from the layer decomposition network is fed into the global enhancement network and local enhancement network by the illumination adjustment network, where the global enhancement network is used for the overall brightness enhancement of the image and the local enhancement network is used for the brightness enhancement of the high dynamic range region.

The illumination adjustment network output can be expressed as:

$$I'(x, y) = \alpha \cdot C(x, y) + (1 - \alpha) \cdot G(x, y)$$

where C(x, y) denotes the output of the local illumination enhancement network, G(x, y) denotes the output of the global illumination enhancement network, I'(x, y) denotes the total output of the illumination adjustment network, and α denotes the weighting factor. The share of the two outputs is adjusted by modifying the value of α, which takes a value in the range of 0 to 1. In this embodiment, the optimal value of α takes a value in the range of 0.75 to 0.85.

Low light image enhancement is used to improve the visual quality of the image to be processed, including noise suppression and illumination adjustment, and its enhancement effect requires the use of an objective evaluation method. Since PSNR and SSIM have the advantages of simple and fast calculation and sensitivity to image distortion, they are used as quality evaluation indexes for metal additive manufacturing low light image enhancement of the present invention.

PSNR is used to measure the peak signal-to-noise ratio of an image quality. For a given original image I of size m×n and a noisy image K to which noise has been added, the MSE can be defined as:

$$MSE = \frac{1}{mn} \sum_{i=0}^{m-1} \sum_{j=0}^{n-1} [I(i, j) - K(i, j)]^2$$

where the size of the original image is m×n, I(i, j) denotes the pixel value of the reference image I at coordinates (i, j), and K(i, j) denotes the pixel value of the image K to be evaluated at coordinates (i, j).

PSNR can be defined as:

$$PSNR = 10 \cdot \log_{10}\left(\frac{MAX_I^2}{MSE}\right) = 20 \cdot \log_{10}\left(\frac{MAX_I}{\sqrt{MSE}}\right)$$

where $MAX_I$ denotes the maximum value of all the pixels representing the image I.

SSIM is used to measure the degree of similarity between two images. Simplified SSIM can be defined as:

$$SSIM = \frac{(2\mu_x\mu_y + C_1)(2\sigma_{xy} + C_2)}{(\mu_x^2\mu_y^2 + C_1)(\sigma_x^2 + \sigma_y^2 + C_2)}$$

where $\mu_x$ and $\mu_y$ denote the mean value of the image pixels, $\sigma_x$ and $\sigma_y$ denote the variance, $\sigma_{xy}$ denotes the covariance, the coordinates of a point in the image are (x, y), and $C_1$ and $C_2$ are constants preventing the denominator from being 0.

The described loss function takes into account the differences between pixels, the structure of the image and contrast features. The loss function can recognize human visual system perceptual differences more efficiently using a combination of PSNR and SSIM compared to MSE alone, and is expressed as:

$$L_{loss} = \left(1 - \frac{PSNR(y_{true}, y_{pred})}{40}\right) + (1 - SSIM(y_{true}, y_{pred}))$$

where $y_{true}$, $y_{pred}$ denotes the original image and the predicted image respectively, $PSNR(y_{true}, y_{pred})$ denotes the peak signal-to-noise ratio of the original image and the predicted image, and $SSIM(y_{true}, y_{pred})$ denotes the structural similarity index of the original image and the predicted image.

Specifically, the NVIDIA Geforce RTX 4060 Laptop GPU is used for training a network model, and the Adam optimizer is selected with a learning rate of 0.001, and a learning rate decay strategy is used to reduce the learning rate to 95% of its original value after each training round, allowing for optimal training at a later stage.

Step 5: The low light image enhancement network model is applied to the S1 online monitoring hardware platform to calculate PSNR and SSIM.

Specifically, the software environment required to invoke the low light image enhancement network model, including Python 3.10, Miniconda, and TensorFlow 2.10, is installed on the computer of the online monitoring hardware platform built at S1 to run the low light image enhancement program.

Figure 4A:
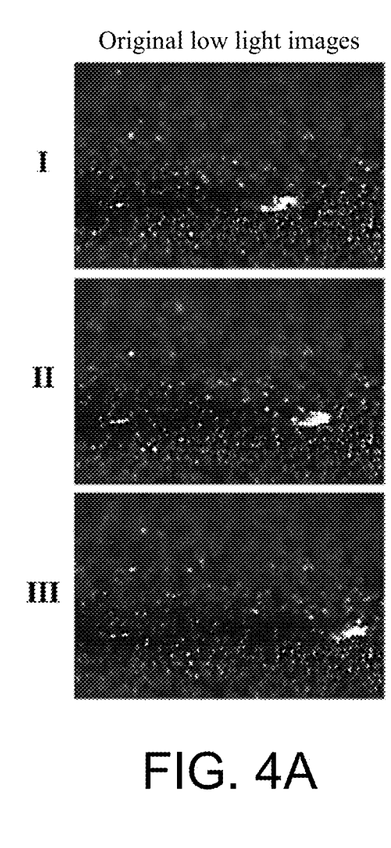
FIGS. 4A to 4H show comparisons of the effect of the low light image enhancement of the present invention with the effect of other low light image enhancement methods respectively.
Figure 4B:
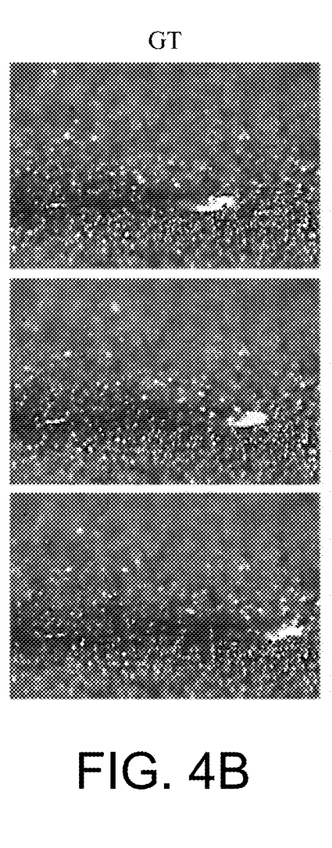
Figure 4C:
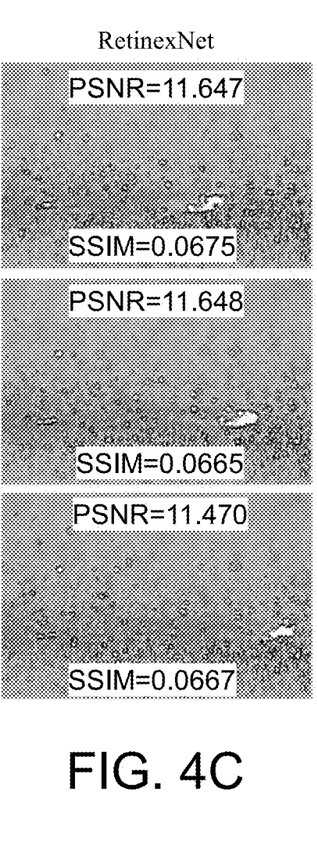
Figure 4D:
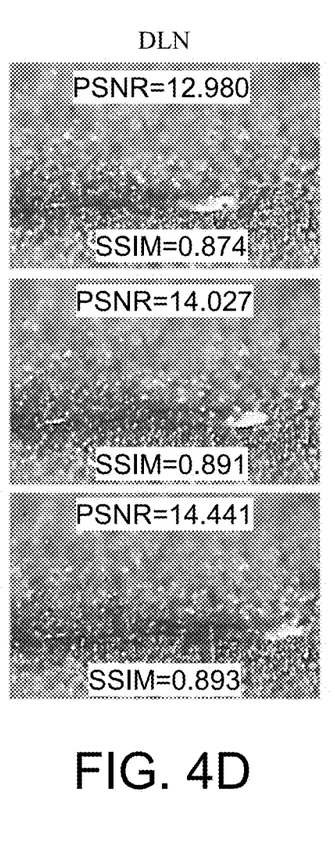
Figure 4E:
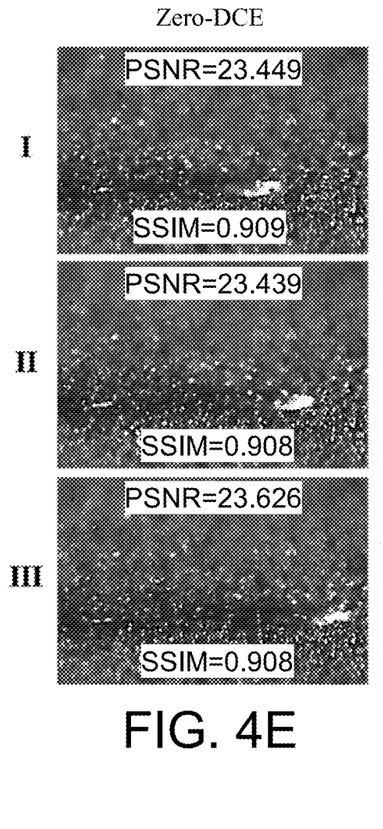
Figure 4F:
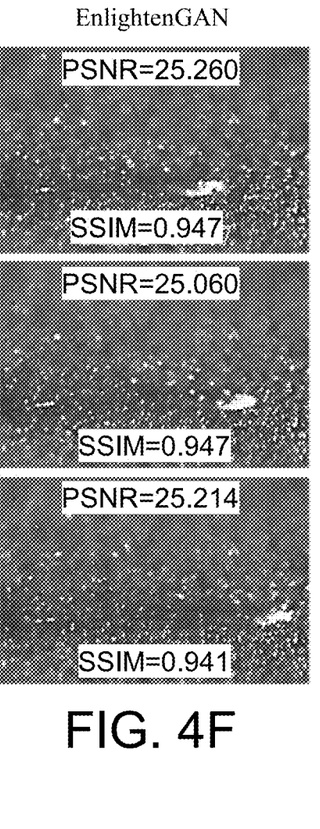
Figure 4G:
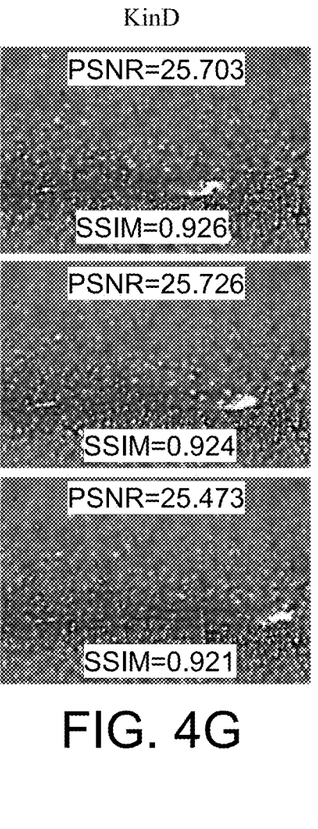
Figure 4H:
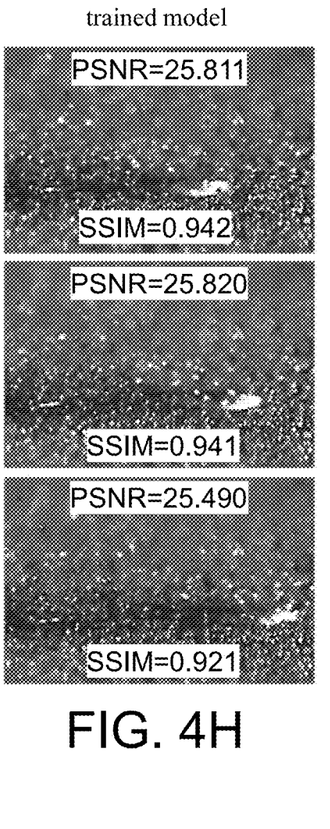

As shown in FIGS. 4A to 4H, three original low light images (as shown in FIG. 4A) are arbitrarily selected from the test set, and the trained model is compared with five existing low light image enhancement methods, including RetinexNet, DLN, Zero-DCE, KinD, and EnlightenGAN. The input size of the model is set to 600×400 pixels. The PSNR and SSIM values between the output bright light images of each low light image enhancement method and the corresponding standard bright light image GT (as shown in FIG. 4B) are calculated separately. The results shown in FIGS. 4C to 4H represent that the proposed methods output images with the highest PSNR and SSIM values for quality evaluation metrics.

Performance testing of low light image enhancement effects as follows.

The enhanced images were subjected to melt pool and sputtering geometric feature extraction using full convolutional neural network (FCN) and the extraction results were analyzed.

Figure 5A:
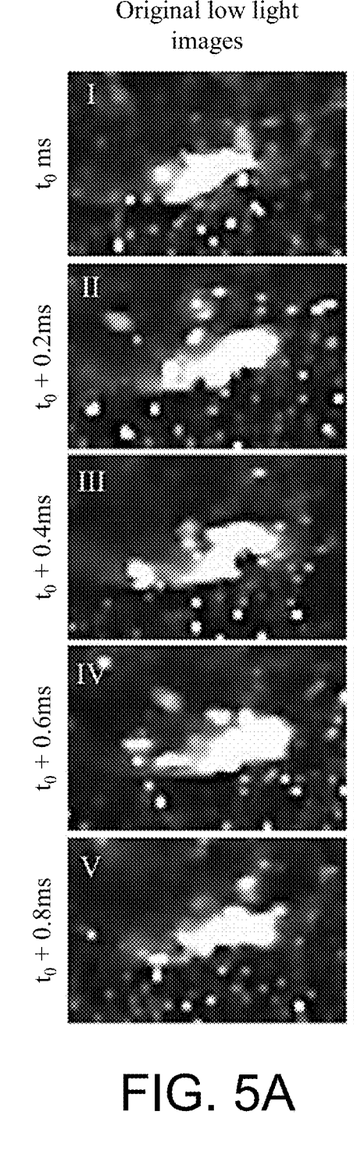
FIGS. 5A to 5E show comparisons of the effect of extracting the melt pool using full convolutional neural network (FCN) before and after enhancement of the low light image of the present invention respectively.
Figure 5B:
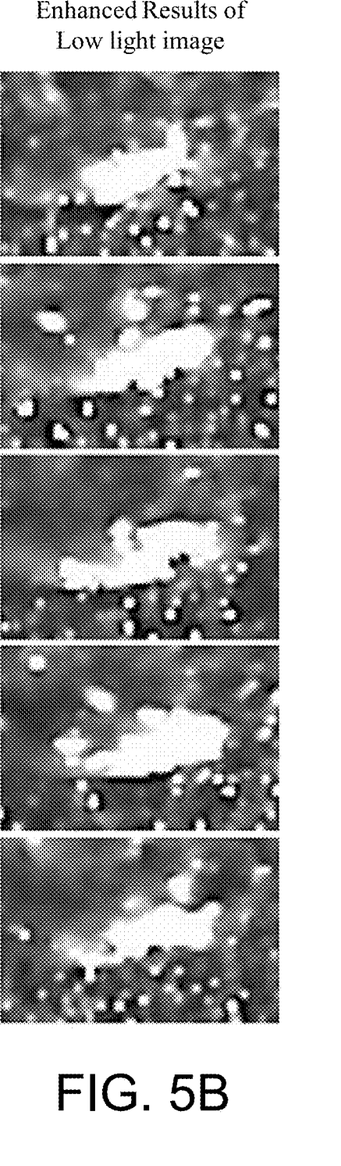
Figure 5C:
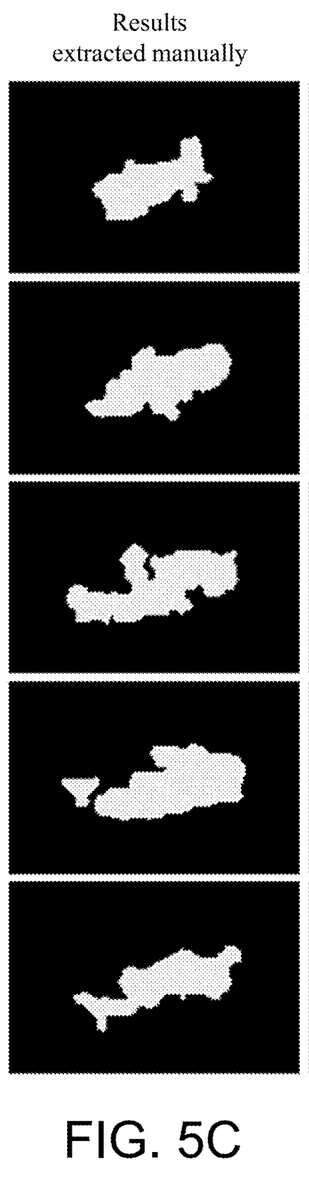
Figure 5D:
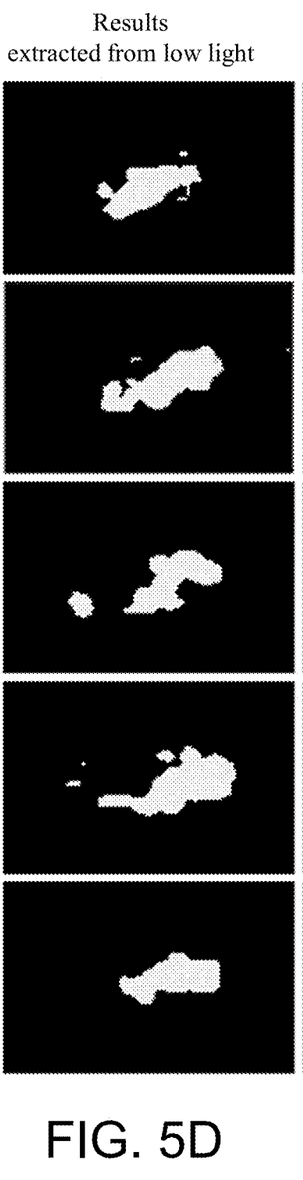
Figure 5E:
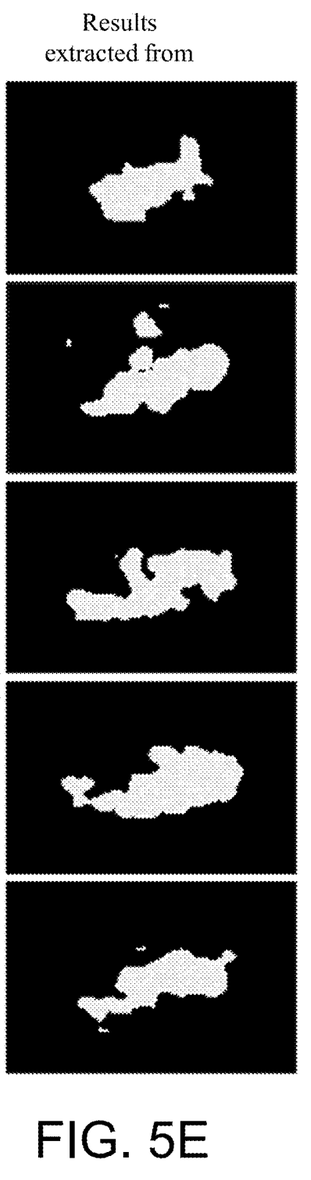

Specifically, as shown in FIG. 5A, five consecutive original low light images are selected and cropped out of the melt pool region, and each image is taken at an interval of 0.2 ms. FIG. 5B shows a sequence of bright light images after the original low light images are enhanced. FIG. 5C shows the contour of the melt pool extracted manually using Labelme software and used as the truth value of the melt pool contour. FIG. 5D shows the result of direct extraction of the original low light image using FCN, and FIG. 5E shows the result of low light image enhancement followed by feature extraction. IoU (Intersection over Union) is used to measure the accuracy of melt pool extraction. The mean value of IoU is 0.85 with a standard deviation of $2.28 \times 10^{-2}$ when FCN is used directly. The IoU for feature extraction using low light image enhancement followed by FCN is significantly higher, with a mean value of 0.94 and a standard deviation of $1.53 \times 10^{-2}$. Compared with direct melt pool extraction on the original low light image, the results of melt pool extraction using the proposed low light image enhancement algorithm followed by extraction results closer to manual extraction with higher accuracy.

Figure 6A:
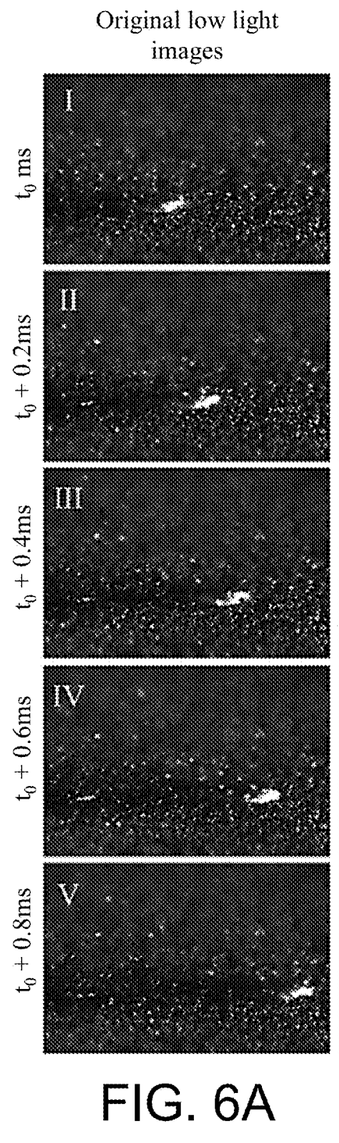
FIGS. 6A to 6E show comparisons of the effect of splash extraction using full convolutional neural network (FCN) before and after enhancement of the low light image of the present invention respectively.
Figure 6B:
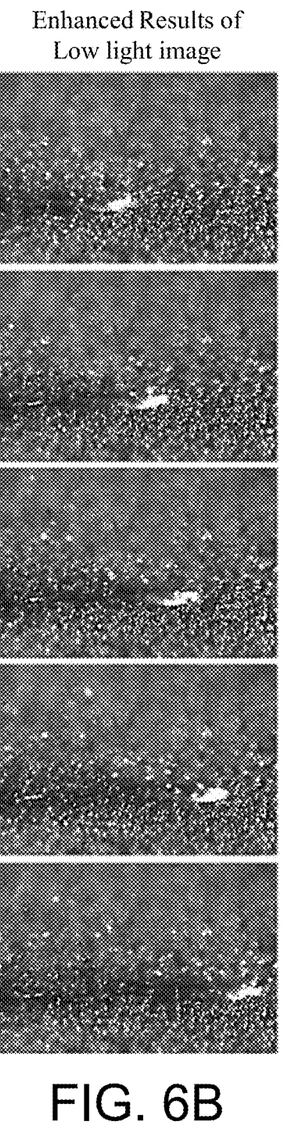
Figure 6C:
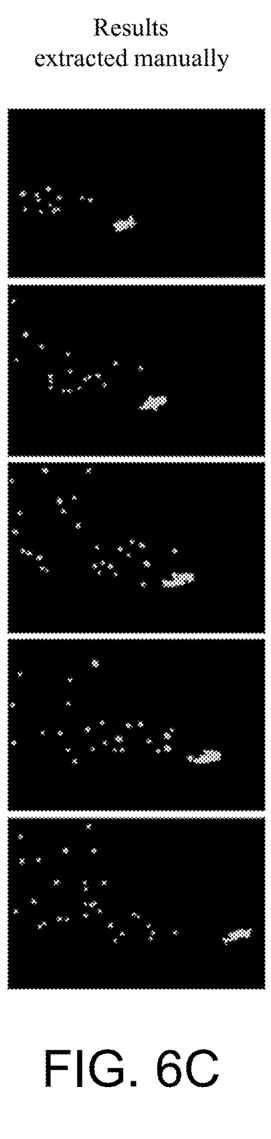
Figure 6D:
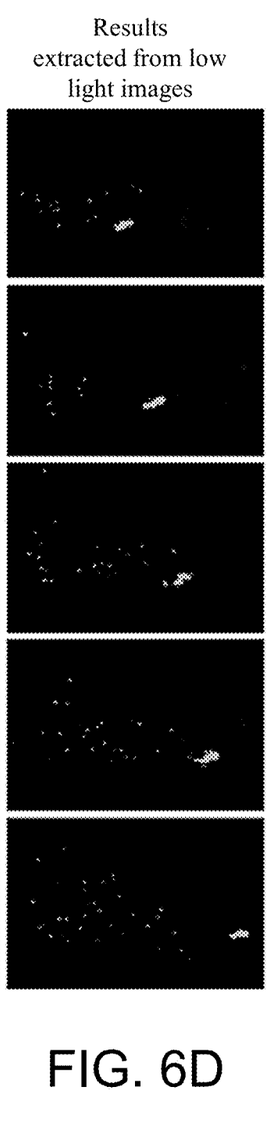
Figure 6E:
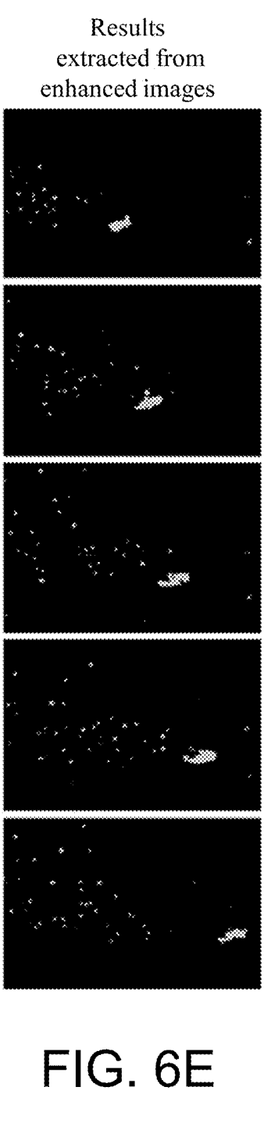

As shown in FIG. 6A, five consecutive original low light images are selected and each image is taken at an interval of 0.2 ms. FIG. 6B shows the sequence of bright light images after the original low light images were enhanced. FIG. 6C shows the contours of the melt pool and sputtering extracted manually using Labelme software and used as the true values. FIG. 6D shows the result of direct extraction of the low light image using the feature extraction algorithm (for example, FCN) and FIG. 6E shows the result of low light image enhancement followed by feature extraction. The balance ($F_1$) of precision and recall is used to measure the sputtering extraction accuracy, which is 24.93 when FCN is used directly. The $F_1$ is significantly higher for feature extraction using low light image enhancement followed by FCN, with an average value of 52.11. Compared to sputtering feature extraction directly on the original low light image, using the proposed low light image enhancement algorithm followed by sputtering extraction is number is higher and closer to manual extraction.

Embodiment 2

This embodiment provides an electronic device comprising a memory, a processor, and a computer program, the processor executing the computer program to implement a low light image enhancement method oriented to on-line visual monitoring of a metal additive manufacturing process as described in Embodiment 1.

Embodiment 3

The present embodiment provides a non-transient computer-readable storage medium which stores a computer program. A low light image enhancement method for online visual monitoring of the metal additive manufacturing process as described in Embodiment 1 is implemented when the computer program is executed by the processor.

Embodiment 4

The present embodiment provides a computer program product, the computer program being executed by a processor to implement a low light image enhancement method oriented to online visual monitoring of a metal additive manufacturing process as described in Embodiment 1.

What is claimed is:

1. A low light image enhancement method for online visual monitoring of a metal additive manufacturing process, characterized by comprising following steps:
   step 1: building a hardware platform for online visual monitoring of the metal additive manufacturing process, and using a high-speed camera to capture a video of the metal additive manufacturing process;
   step 2: exporting the video captured originally frame by frame, and constructing a low light and bright light image dataset, wherein a bright light image is obtained by brightening a low light image;
   step 3: constructing a low light image enhancement network model based on Retinex vision theory, wherein the low light image enhancement network model comprises a layer decomposition network, a reflection adjustment network and an illumination adjustment network; the layer decomposition network comprises a reflection map branch and an illumination map branch; the reflection map branch is used to extract reflection components and features from an image which is input to generate a reflection map; the illumination map branch is used to obtain feature maps from the reflection map branch to extract and enhance light features of the image; the reflection adjustment network gradually extracts and abstracts image features through a series of convolutional layers to output an adjusted reflection image; the illumination adjustment network is used to enhance local details and global illumination variations of the image to generate an illumination map recovery image, wherein
   wherein in the step 3, the reflection map branch in the layer decomposition network sequentially comprises a first convolutional+ReLU layer, which comprises Conv+ReLU 32, Conv+ReLU 64 and Conv+ReLU 128, a first transposed convolutional+ReLU layer, a first connection layer, a second convolutional layer+ReLU layer, a second transposed convolutional+ReLU layer, a second connection layer, a third convolutional layer+ReLU layer, and a convolutional layer+Sigmoid function; the first convolutional layer+ReLU layer is jump-connected to the first connection layer and the second connection layer, respectively; the illumination map branch includes a convolutional+ReLU layer, a connection layer, and a convolutional layer+Sigmoid function; light changes are captured and adjusted by performing deep convolution and nonlinear activation on the feature maps to simulate changes in lighting conditions and details,
   wherein in the step 3, the reflection adjustment network sequentially comprises: an initial convolutional layer for extracting initial features of the image, a second convolutional layer for capturing a larger range of contextual information, a third convolutional layer for enhancing the expressiveness of the features, a fourth convolutional layer for feature fusion while maintaining details, a fifth convolutional layer for extracting deep features of the image, and a final convolutional layer for generating an adjusted reflection image by using ReLU activation function,
   wherein in the step 3, the illumination adjustment network comprises a local sub-network and a global sub-network,
   wherein the global sub-network comprises an average pooling layer, three layers of convolutional layer+ReLU layer, a convolutional layer+Sigmoid function in turn, which are used to capture and adjust the global illumination variations of the image; the global sub-network captures overall illumination information of the image through the average pooling layer and uses a convolutional kernel to perform feature mapping and combining, which ultimately generates a global sub-network image,
   wherein the local sub-network comprises four convolutional layers+ReLU layer, a convolutional layer+Sigmoid function, which are used to refine and enhance local illumination details and mapped to an output channel, and
   wherein local and global features are combined by parameter weighting to balance effects of detail enhancement and overall brightness adjustment to produce an illumination map recovery image;
   step 4: training the low light image enhancement network model, calculating a peak signal-to-noise ratio (PSNR) and a structural similarity index (SSIM), and then calculating a loss function to complete an iterative training of the low light image enhancement network model; and
   step 5: deploying the low light image enhancement network model to an online monitoring hardware platform to calculate image quality evaluation metrics of the PSNR and the SSIM.

2. The low light image enhancement method for online visual monitoring of the metal additive manufacturing process according to claim 1, wherein in the step 1, the hardware platform for monitoring comprises a computer, an illumination light source power supply, a high-speed camera, a macro lens, an illumination light source and a metal additive manufacturing device.

3. The low light image enhancement method for online visual monitoring of the metal additive manufacturing process according to claim 1, wherein in the step 4, the PSNR is calculated as follows:

$$PSNR = 10 \cdot \log_{10}\left(\frac{MAX_I^2}{MSE}\right) = 20 \cdot \log_{10}\left(\frac{MAX_I}{\sqrt{MSE}}\right)$$

where $MAX_I$ denotes a maximum value taken by all pixels of image I;

$$MSE = \frac{1}{mn}\sum_{i=0}^{m-1}\sum_{j=0}^{n-1}[I(i,j) - K(i,j)]^2$$

where a size of an original image comprises m×n pixels, I(i,j) denotes a pixel value of a reference image I at coordinates (i, j), and K (i,j) denotes a pixel value of an image K to be evaluated at coordinates (i, j);
a formula for the SSIM is as follows:

$$SSIM = \frac{(2\mu_x\mu_y + C_1)(2\sigma_{xy} + C_2)}{(\mu_x^2\mu_y^2 + C_1)(\sigma_x^2 + \sigma_y^2 + C_2)}$$

where $\mu_x$ and $\mu_y$ denote a mean value of the image pixels, $\sigma_x$ and $\sigma_y$ denote a variance, $\sigma_{xy}$ denotes a covariance, coordinates of a point in the image are (x, y), and $C_1$ and $C_2$ are constants.

4. The low light image enhancement method for online visual monitoring of the metal additive manufacturing process according to claim 1, wherein in the step 4, the loss function is calculated as follows:

$$L_{loss} = \left(1 - \frac{PSNR(y_{true}, y_{pred})}{40}\right) + (1 - SSIM(y_{true}, y_{pred}))$$

where $y_{true}$, $y_{pred}$ denote an original image and a predicted image, respectively, $PSNR(y_{true}, y_{pred})$ denotes the peak signal-to-noise ratio of the original image and the predicted image, and $SSIM(y_{true}, y_{pred})$ denotes the structural similarity index of the original image and the predicted image.

5. An electronic device, comprising a memory, a processor and a computer program stored on the memory and runnable on the processor, characterized in that processor executing the computer program implements the low light image enhancement method for online visual monitoring of the metal additive manufacturing process as claimed in claim 1.

6. A non-transitory transient computer-readable storage medium on which a computer program is stored, characterized in that computer program when executed by a processor implements the low light image enhancement method for online visual monitoring of the metal additive manufacturing process as claimed in claim 1.

* * * * *